Oct. 12, 1965   D. B. CARROLL ETAL   3,212,762
FOAM GENERATOR
Filed May 23, 1960

INVENTORS.
Don B. Carroll
John W. Rodgers
BY C.W. Carlin
ATTORNEY

United States Patent Office 3,212,762
Patented Oct. 19, 1965

3,212,762
FOAM GENERATOR
Don B. Carroll, Tulsa, Okla., and John W. Rodgers, Spokane, Wash., assignors to The Dow Chemical Company, Midland, Mich., a corporation of Delaware
Filed May 23, 1960, Ser. No. 30,953
2 Claims. (Cl. 261—124)

The invention is an apparatus useful for generating foam. The term foam, as used herein, means an intimate mixture of a liquid and a gas wherein the liquid is a continuous phase and the gas is a discontinuous phase. In foam, the gas is entrained or suspended in the liquid as finely divided bubbles of varying size, resulting in a heterogeneous mixture. The density of a foam, made from a specific liquid and gas, varies dependent upon such factors as the ratio of liquid to gas, the rate of collapse of the gas bubbles, drainage of liquid from the foam, and the like. Foams having a high percent of liquid in the fluid state are designated wet foams and those having a low percent of liquid in the fluid state are designated dry foams.

Foams are of wide-spread significance. The significance is of a vastly varying nature dependent upon the particular circumstances in which foam is concerned. In some circumstances, the production of foam is detrimental and something to be avoided, e.g., the lingering or stable foams which interfere with a number of procedural operations. In other circumstances, the production of a somewhat stable foam is necessary for the obtainment of the desirable ends of an operation, e.g., in the manufacture of foamed liquid compositions which subsequently gel or solidify in such foamed state to make cellular products such as those of rubber, resin, and metal.

It has been recently discovered that scale, residue, and the like, resisting removal from the interior surface of a vessel, may be removed therefrom and the vessel thereby cleaned in a convenient, economical, and efficient manner by forcing through such vessel a foam prepared, broadly, by forcing a gas, e.g., air or nitrogen, under pressure and preferably in finely divided streams, upwardly through a body of a liquid confined in a container having an outlet leading to the vessel from which scale or residue is sought to be removed from the interior thereof, said liquid having a chemically reactive or solubilizing effect on such scale or residue, whereby a foam is formed in said container, and by continuous application of pressure on the gas entering the container, the foam thus formed is forced outwardly from the container through said outlet and into and through the vessel from which the scale and residue are to be removed.

In the use of a foam described in the paragraph immediately above it is desirable that the foam be produced at a satisfactory rate, comprise relatively fine or small gas cells, and have a satisfactory rate of collapse to provide sufficient liquid solvent for the scale when in contact therewith but yet be sufficiently stable to resist complete collapse before emergence from the vessel being cleaned. The term "vessel" as used herein includes tanks, bins, cooling towers, transfer lines, and pipes, tubing, and coils of all types, e.g., those employed in heat exchangers, boilers, and the like, and being closed except for entrance and exit means.

Foam is usually generated in conventional practice in foamers or foam-producing devices or apparatuses. Presently employed foamers consist chiefly of a container for the liquid to be foamed and a means for introducing a gas into the liquid in the container and thereafter forcing the gas, usually in fine streams, upwardly through at least a portion of the liquid and thence from the surface of the liquid, carrying with it entrained liquid constituting a foam.

It was discovered that the quality of foam produced by the known method of passing finely divided streams of a gas, e.g., those produced by a sparger, upwardly through a body of liquid, was dependent upon the distance from the point at which the gas was released below the surface of the liquid and the top surface of the liquid. Between rather limited ranges, this distance was found to be critical and, therefore, to produce a satisfactory foam it was found necessary to replenish the liquid supply at about the rate at which it was used. However, due to the rippled, disrupted, or turbulent surface of the liquid through which the gas was being passed, the distance through which the gas passed constantly varied even though the liquid volume was maintained substantially unchanged. Furthermore, in known foaming apparatuses, a suitable means for providing drainage of excess liquid from foam which is wetter, than desired, is not provided.

In the art of foam making, especially for foam cleaning of vessels, there is a need for an improved foaming apparatus which produces a consistent and superior quality of satisfactorily stable foam at a high volume rate. There is a further need for a means for effecting a separation of excess liquid from the foam produced.

The invention is an apparatus which meets these needs and consists, accordingly, of the features and members positioned and arranged as hereinafter described, it being understood that variations thereof, which would occur to those skilled in the art, fall within the purview of the invention.

The description of the invention is to be read in connection with the annexed drawing wherein.

In the figures, like numerals designate like parts.

Figure 1:
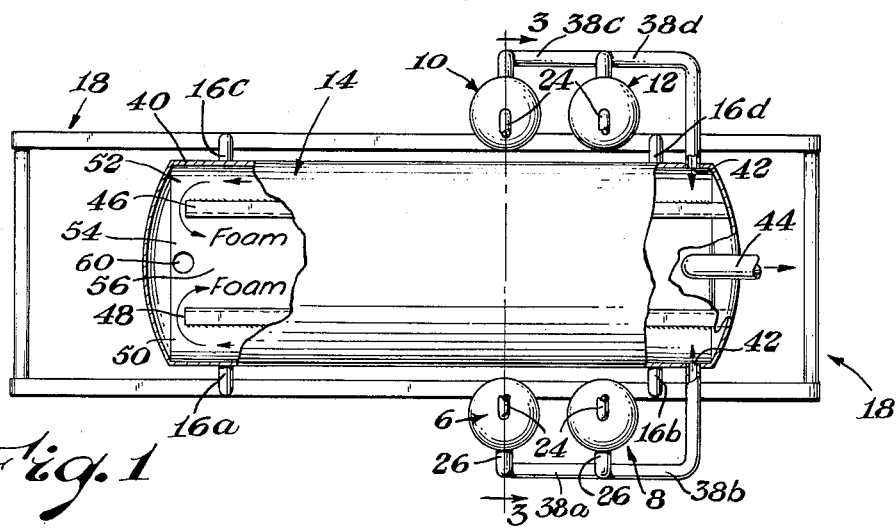
FIGURE 1 is a plan view of an apparatus of the invention with parts broken away to show internal structure.
Figure 2:
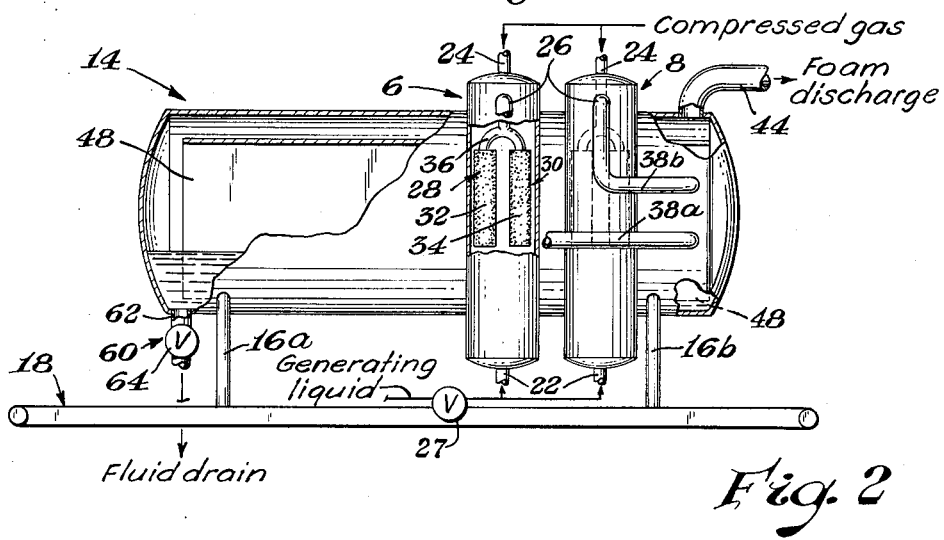
FIGURE 2 is a longitudnial elevational view of the apparatus of FIGURE 1 with parts broken away to show internal structure.
Figure 3:
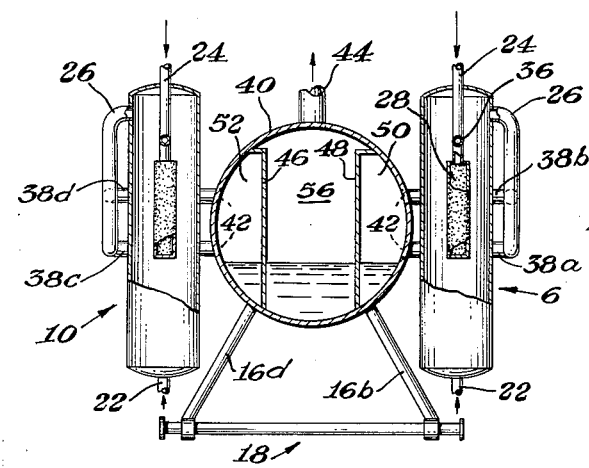
FIGURE 3 is a transverse sectional view of the apparatus of FIGURES 1 and 2 taken along line 3—3 of FIGURE 1.

The apparatus of the drawing comprises four generating assemblies or aerators 6, 8, 10, and 12 vertically positioned adjacent to, and suitably connected with, separator 14 which is mounted on upright legs 16a, 16b, 16c, and 16d, supported by generally rectangular frame 18 which may rest upon the ground or bed of a carrying vehicle.

The aerators or generator assemblies are substantially identical and the structure and elements which are shown and described in some detail for aerator 6 are also applicable to aerators 8, 10, and 12. In each aerator there are shown liquid inlet 22, gas inlet 24, wet foam outlet 26, and substantially identical septums 28 and 30, comprising cylindrical spargers 32 and 34, centrally connected at the top thereof with pipe 36 leading from gas inlet 24. Foam outlets 26 located near the top of each aerator are connected by pipes 38a, 38b, 38c, and 38d, respectively, to separator 14 as shown.

Separator 14 is a foam drainage chamber defined by shell 40 having wet foam inlets 42 in the side thereof to admit foam from each of the aerators, and foam outlet 44 in the top thereof. Baffles 46 and 48 are shown extending longitudinally in separator 14 from the end near to the foam inlets 42 toward the opposite end but not making contact with said opposite end, thereby forming exterior foam passageways 50 and 52 between baffles 48 and 46, respectively, and shell 40, end zone or bay 54, and central foam passageway 56. Inlets 42 are shown, opening into exterior passageways 50 and 52. Outlet 44 is shown leading from central passageway 56 to the place of usage (not shown), e.g., by way of a conducting pipe connected to 44 to a vessel to be cleaned. Drain assembly 60, consisting of outlet 62 and valve 64, is located in the bottom of separator 14. Conventional flow control means and measuring devices (not shown) are conveniently located in the liquid, gas, and foam lines, for example, in the liquid and gas supply lines leading to the inlets of the aerators illustrated by inlets 22 and 24, respectively, of the aerators; in the foam lines leading from outlet 44 of separator 14 leading to the place of usage.

The apparatus shown in the drawing depicts but one of a number of embodiments of the invention. A number of variations of the apparatus shown may be made without departing from the spirit and scope of the invention. For example, only one, two or three, or more than four generating units or aerators, designated by numerals 6, 8, 10, and 12 in the drawing may be employed. Only one or a plurality of several spargers, designated by numerals 32 and 34 in aerator 6, may be employed in each of aerators 6, 8, 10, and 12. No baffle, only one baffle, or more than 2 baffles, designated by numerals 46 and 48 in the separator 14, in the drawing may be employed. When no baffle is employed, the outlet for foam, designated 44 in the drawing, is advantageously located near the opposite end of separator 14 from the point of entrance of the wet foam from the aerator or aerators.

The foam generators or aerators may be arranged in any convenient manner, e.g., all on one side of the separator arranged in a row or otherwise grouped or some may be placed on each side of the separator.

The relative sizes of the aerators and the spargers contained therein are not highly critical. Usually a sparger of between about 2 and 3 feet in height and between about .25 and .33 foot in diameter is employed in a generator or aerator of between about 3 and 6 feet in height and between 0.33 and 0.5 foot in diameter. The sparger is usually positioned between about 0.5 and 1.5 feet from the top of the aerator having a height of between 3 and 6 feet. A cylindrically shaped sparger, as shown, is not required, nor is it required that the aerator itself be cylindrical although such shapes have been found most convenient. The size and number of openings in the sparger, illustrated by 32 and 34, and the wall thickness (through which the gas flows) are not highly critical. A diameter of 0.004 inch, more or less, illustrates a size opening commonly employed. The material out of which the spargers are made is optional but is preferably of a corrosive resistant material, an $Al_2O_3$-containing material, Aloxite being satisfactory. Sintered metals and foamed metals may also be employed.

The size of separator 14 may vary over a rather wide range. The location of the inlet and outlet of separator 14 may be anywhere above level of the liquid separated from the foam and retained in the separator.

The size of inlet and outlet pipes depends upon the size of the apparatus, the pressure employed, and upon the volume of foam being produced. The gas may be supplied by a conventional compressor or by a gas under pressure confined in a suitable container, e.g., a steel bottle.

The interior of the aerators, separator, transfer lines, valves, and the like of the apparatus are advantageously composed of a corrosion resistant material since acidic or alkali descaling solvents are often employed in foam cleaning operations.

To produce foam employing the apparatus of the invention, e.g., as illustrated in the drawing, a gas, e.g., air, is admitted into the aerators as by inlets 24, and a liquid containing a solvent, e.g., a substance reactive with the scale, and a foaming agent, e.g., a surfactant, is admitted into the bottom of the aerators, as by inlets 22 of the aerators 6, 8, 10, and 12. The flow of gas and of liquid are individually controlled, as desired, by suitably positioned valves and flow meter arrangements, as discussed above. The level of liquid in the aerators is usually maintained by the liquid control valve 27 in such a manner that no unfoamed liquid exists around the upper half of the spargers, e.g., those shown by numerals 28 and 30. The gas pressure and rate of flow of liquid are controlled to produce a satisfactory foam at a suitable rate. A volume of between 10 and 100 gallons of liquid and between 20 and 200 cubic feet of gas per minute illustrate the practice of the invention. Foam is formed in the aerators and is forced therefrom by additional foam as it forms into the separator, designated 14 in the drawing, and passes the length thereof at least once during which liquid drains from the foam and collects in a body at the bottom of the separator. The percent of liquid which drains from the foam in the separator varies but is often somewhere between 20 and 80 percent by volume of the total liquid contained in the wet foam leaving the aerators. The thus drained foam is forced out of the separator, as through outlet 44 and thence to the place in which it is used, e.g., a vessel being cleaned. The liquid drained from the foam in separator 14 is periodically or continuously tapped from the bottom thereof as through drain assembly 60 and returned for reuse to a liquid feed line, e.g., one or more of the lines leading to an inlet 22 of the aerators.

The following example is illustrative of the practice of the invention:

A 20,000 gallon condenser was employed to condense the steam effluent wherein a steam-driven turbine is used in the production of electrical power. River water is used as the cooling medium. The condenser consisted essentially of 4,000 tubes of admiralty steel, ¾ inch in diameter open at both ends, positioned substantially parallel to one another, and confined in a shell; when the condenser is in operation, river water flows through the tubes and steam flows around the outside where it is cooled and condensed into water. During use, the interior of the tubes had become coated with a tenaciously adhering scale composed chiefly of a combination of river mud and iron oxides. This material, being a thermally insulating composition, caused severe impairment of heat transfer through the tube walls. The passageways through the tubes were also considerably constricted by the accumulation of the scale therein as shown by the difficulty with which water could be passed through the condenser. The difficulty of passage through the condenser was evidenced by the fact that when little or no scale was present, the pressure drop resulting from the condensation of steam in the condenser amounted to a difference of about 0.8 inch of mercury. However, at the time cleaning of the condenser was undertaken in accordance with the practice of the invention, a difference in pressure due to condensation in the condenser was only 0.2 inch mercury due to the accumulated scale on the interior of the tubes.

A cleaning composition was prepared for use in this example by admixing 2,000 gallons of a 15 percent by weight aqueous solution of hydrogen chloride, 4 gallons of abietyl amine corrosion inhibitor, and 10 gallons of a sodium salt of N-lauroyl-betaiminodipropionate as a foaming agent in a suitable tank. A foaming apparatus of the type shown in the drawing was employed. The apparatus was capable of providing a continuous flow of foam through 4 inch foam lines leading from aerators 6, 8, 10 and 12 to separator 14. A transfer line led from a tank of cleaning composition (not shown) to the bottom inlets of each of aerators 6, 8, 10, and 12, e.g., the inlet indicated by numeral 22 of aerator 6. When the level of the liquid in the aerators had risen to a point in the aerator to submerge the lower portion of the spargers therein, e.g., those represented by numerals 28 and 30 in aerator 6, air was introduced from an air compressor connected to air lines leading to the tops of the aerators, e.g., that leading to inlet 24 on aerator 6.

The air was introduced at a rate of 100 cubic feet per minute and the flow of liquid independently controlled to yield a foam as it left the aerators of a 20:1 volume ratio of gas to liquid. Foam was produced in this ratio at a rate of about 600 gallons per minute during the start-up period. The foam thus produced was forced through foam pipes leading from the aerators, as illustrated by pipe 38 leading from outlet 26 of aerator 6, to inlets 42, and passed along exterior passageways 50 and 52 into end zone 54 and thence back through central passageway 56. The foam then was forced out of foam outlet 44 of separator 14 through a transfer line to the condenser to be cleaned.

The behavior of the foam in the condenser being cleaned was observed during the early part of the cleaning operation as follows: The foam first completely filled the injection area at the end of the tubes in the entrance end of the condenser; then the lower tubes of the condenser filled with foam; subsequently, in ascending order, all the tubes of the condenser filled with foam; thereafter the foam in the condenser tubes moved therethrough during which some breaking of the foam occurred, the acid solution thus formed moving largely through the tubes and collecting at the outlet area at the exit end of the tubes. After 1 hour of operation at this rate, the rate of air into the aerators was reduced so that foam was produced at a rate of 200 gallons per minute. This rate of foam production was continued for 2 hours during which the entire volume of prepared solvent was used. After the solvent had been completely used, the condenser was flushed free of foam by forcing water therethrough.

During the operation, had it been desirable, the condensed solvent in the water zone of the condenser could have been conveniently drained back to the foam making apparatus, e.g., into one or more of the aerators.

After the treatment the interior of the unit was examined and found to be at least about 80 percent clean. Thereafter the unit was put back in operation. It was observed that the pressure differential, i.e., the reduction in pressure of the steam between the times it entered and left the condenser was again 0.8 inch of mercury, thereby showing an improvement of 0.6 inch of mercury in the condensing power of the condenser due to the scale removal by the foam produced by the apparatus of the invention. The observed percent efficiency of the operation, viz., 80 percent, was thereby substantially verified. Methods previously employed in attempts to remove scale from this condenser had heretofore attained an improvement sufficient to increase the pressure differential by only 0.2 inch mercury.

An examination of the examples show that the apparatus of the invention is highly efficient to produce a foam of consistent superior quality for use in removing adhering scale from the interior of vessels.

Having described the invention, what is claimed and desired to be protected by Letters Patent is:

1. An apparatus for making foam comprising at least one closed-in aerator provided with a liquid inlet at the bottom, a wet foam outlet near the top and having positioned therein intermediate said inlet and outlet at least one substantially annular-shaped porous vertically elongated rigid sparger, said foam outlet having a discharge line leading therefrom; a gas inlet in the top of said aerator having a pipe connected thereto and leading from said gas inlet directly downwardly into the inner portion of said sparger; means for supplying gas at sufficient pressure to force gas from an outside source into said gas inlet and thence into said sparger outwardly therethrough and to move the foam made upwardly and out the foam outlet of the aerator and into and along said discharge line leading therefrom; a means for providing the liquid to a level in the aerator sufficiently high to surround only the lower portion of the sparger and to expose the upper portion of the sparger above the liquid level whereby it is surrounded by foam during the generation thereof; a horizontally positioned separator to separate excess liquid from the foam having a wet foam inlet positioned in the side thereof intermediate the top and bottom near one end thereof, said discharge line leading thereto from the wet foam outlet of the aerator and said separator provided with continuous vertically disposed elongated baffles therein to provide horizontal longitudinal passageways and said baffles including means to position said baffles to permit passage transverse thereto at the end of the separator opposite the end near which the foam inlet of the separator is positioned; a foam outlet in the upper part of the separator located above said wet foam inlet; and a drain means in the lower part of the separator for the removal of liquid therein from the foam and to maintain a liquid level therein below the full capacity of the separator.

2. The apparatus of claim 1 wherein the pores in said sparger have an average diameter of about 0.004 inch.

References Cited by the Examiner

UNITED STATES PATENTS

| 1,834,646 | 12/31 | Sandor. | |
| 1,885,785 | 11/32 | Thomson | 261—122 |
| 2,099,802 | 11/37 | Ewing | 261—123 |
| 2,595,602 | 5/52 | Parks | 55—186 X |

FOREIGN PATENTS 254,285    3/27    Great Britain.

HARRY B. THORNTON, *Primary Examiner.*

HERBERT L. MARTIN, *Examiner.*